United States Patent
Nair et al.

(10) Patent No.: US 10,534,887 B1
(45) Date of Patent: Jan. 14, 2020

(54) POWER DOMAIN PLACEMENT OF CIRCUIT COMPONENTS IN ADVANCE NODE CUSTOM DESIGN

(71) Applicant: Cadence Design Systems, Inc., San Jose, CA (US)

(72) Inventors: Sravasti Nair, San Jose, CA (US); Subhashis Mandal, San Jose, CA (US); Chandra Prakash Manglani, San Jose, CA (US); Nikhil Garg, San Jose, CA (US); Preeti Kapoor, San Jose, CA (US); Kanaka Raju Gorle, San Jose, CA (US)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 63 days.

(21) Appl. No.: 15/994,255

(22) Filed: May 31, 2018

(51) Int. Cl.
*G06F 17/50* (2006.01)

(52) U.S. Cl.
CPC ...... *G06F 17/5072* (2013.01); *G06F 17/5081* (2013.01)

(58) Field of Classification Search
CPC .................. G06F 17/5072; G06F 17/5081
USPC ........................ 716/112, 119, 120
See application file for complete search history.

(56) References Cited

U.S. PATENT DOCUMENTS

| | | | | |
|---|---|---|---|---|
| 3,717,865 A | * | 2/1973 | Hughes | B23K 9/0956 340/635 |
| 5,701,255 A | * | 12/1997 | Fukui | G06F 17/5068 257/208 |
| 8,400,746 B1 | * | 3/2013 | Keramat et al. | H01L 27/0207 361/111 |
| 2012/0254821 A1 | * | 10/2012 | Baba | G06F 17/5072 716/136 |
| 2017/0235865 A1 | * | 8/2017 | Preuthen et al. | G06F 17/5072 716/119 |

* cited by examiner

*Primary Examiner* — Sun J Lin
(74) *Attorney, Agent, or Firm* — McDermott Will & Emery LLP

(57) ABSTRACT

A method including creating a plurality of component groups in a circuit layout coupling multiple components in each component group of the plurality of component groups with a power rail, a ground rail, or a bulk, is provided. The method includes creating internal clusters based on a group cost and including the group cost in an overall cost function, forming a gap between two component groups of the plurality of component groups, and filling the gap with a first gap cell adjacent to a first power rail and to a first ground rail, and a second gap cell adjacent to the first gap cell. A system and a non-transitory, machine readable medium storing instructions to perform the above method are also provided.

20 Claims, 10 Drawing Sheets

POWER DOMAIN PLACEMENT OF CIRCUIT COMPONENTS IN ADVANCE NODE CUSTOM DESIGN

TECHNICAL FIELD

Embodiments described herein are generally related to the field of circuit simulation in circuit designing and fabrication. More specifically, embodiments described herein are related to power management in large integrated circuit designs including multiple power domains.

BACKGROUND

Current trends in circuit designs are gearing toward including multiple power domains having different power rails to provide a differentiated supply to different components of a circuit. This strategy makes a more efficient use of the available power in a circuit. Use of differentiated power supplies is common in circuits such as custom memory devices, where 'read' and 'write' commands typically use different power levels to operate. However, arranging the different circuit components around the different power rails in a circuit becomes challenging as the interconnectivity between two or more circuit components also imposes physical constraints in terms of signal integrity, capacitive effects, breakdown and short-circuiting, and others. Attempts to do this manually typically lead to inefficient placement of components and to a waste of circuit real estate.

The description provided in the background section should not be assumed to be prior art merely because it is mentioned in or associated with the background section. The background section may include information that describes one or more aspects of the subject technology.

SUMMARY

In a first embodiment, a computer-implemented method for simulating an integrated circuit design is described. The method includes creating component groups in a circuit layout based on a coupling of multiple components in each component group with a power rail, a ground rail, or a bulk, and creating internal clusters within a component group based on a group cost and including the group cost in an overall cost function. The method also includes forming a gap between two component groups based on circuit specifications, filling the gap, at least partially, with a first gap cell and a second gap cell, wherein the first gap cell is adjacent to a power rail and a ground rail and the second gap cell is adjacent to the first gap cell.

In a second embodiment, a system is described that includes a memory, storing instructions, and at least one processor that executes the instructions. When the processor executes the instructions, the system performs steps to create component groups in a circuit layout based on a coupling of multiple components in each component group with a power rail, a ground rail, or a bulk, and to create internal clusters within a component group based on a group cost and including the group cost in an overall cost function. The system also performs steps to form a gap between two component groups based on circuit specifications, to fill the gap, at least partially, with a first gap cell and a second gap cell, wherein the first gap cell is adjacent to a power rail and a ground rail and the second gap cell is adjacent to the first gap cell.

In yet another embodiment, a non-transitory, machine-readable storage medium is described that includes machine-readable instructions for causing a processor to execute a method. The method includes creating component groups in a circuit layout based on a coupling of multiple components in each component group with a power rail, a ground rail, or a bulk and creating internal clusters within a component group based on a group cost and including the group cost in an overall cost function. The method also includes forming a gap between two component groups based on circuit specifications, filling the gap, at least partially, with a first gap cell and a second gap cell, wherein the first gap cell is adjacent to a power rail and a ground rail and the second gap cell is adjacent to the first gap cell.

In a further embodiment, a system is described that includes a means for storing instructions and a means to execute the instructions to perform steps to execute a method including creating component groups in a circuit layout based on a coupling of multiple components in each component group with a power rail, a ground rail, or a bulk and creating internal clusters within a component group based on a group cost and including the group cost in an overall cost function. The method also includes forming a gap between two component groups based on circuit specifications, filling the gap, at least partially, with a first gap cell and a second gap cell, wherein the first gap cell is adjacent to a power rail and a ground rail and the second gap cell is adjacent to the first gap cell.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

Figure 1:
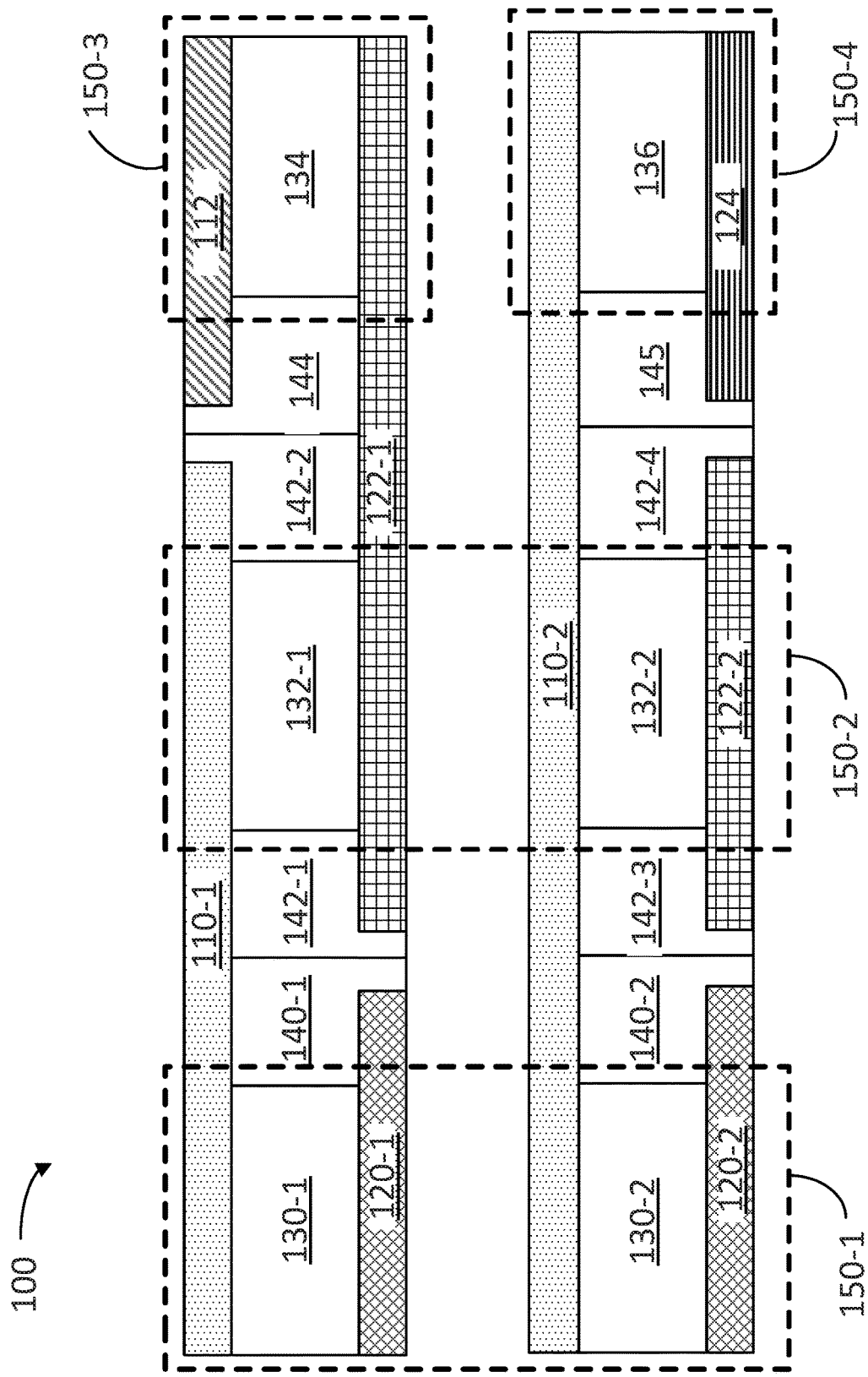
FIG. 1 illustrates a plan view of a circuit layout including multiple power domains, according to some embodiments.

In the figures, elements and steps denoted by the same or similar reference numerals are associated with the same or similar elements and steps, unless indicated otherwise. In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

In circuit design, two parameters to consider are the use of physical space (or "real-estate") on the chip, and power consumption. Circuit designers constantly struggle to design circuits under the above constraints while improving circuit performance. Instead of performing this task manually by circuit designers, embodiments as disclosed herein provide an automatic tool to place circuit components and provide a circuit layout that makes efficient use of circuit area and separates different power domains for efficient handling (e.g., interconnect layout and power distribution).

The disclosed system provides a placement engine that enables circuit designers to automatically identify and select component groups clustered around well-defined power domains of a larger circuit layout. A system as disclosed herein results in a reduction of circuit real-estate (e.g., physical space used), and a more efficient routing of circuit interconnects, reducing both parasitic effects, and the number of physical gaps typically used to separate different power domains in a circuit layout.

The disclosed system addresses a technical problem tied to computer technology and arising in the realm of computer networks, namely the technical problem of circuit designers manually designing circuits with real-estate and power consumption constraints while attempting to improve circuit performance. The technical problem is solved using the disclosed technical solution, namely, by automatically providing a circuit layout wherein different components (e.g., logic cells and the like) are grouped according to their specified power domains, thus reducing computer-time for a designer, increasing the efficiency and power usage of the computer. The disclosed system further solves this problem by identifying power domains and mapping core cells in the circuit layout to each power domain according to a suffix or a prefix of a power source in the netlist entry corresponding to the core cell.

Further, some embodiments disclosed herein offer an advantage of ensuring that different logic cells in different power domains do not interfere with each other, which would create short-circuit, cross-talk, leakage and other deleterious effects. Embodiments as disclosed herein are able to group circuit components in component groups based on a common power rail, but different ground rails. In some embodiments, different component groups as disclosed herein may include logic cells sharing a common ground but not a common substrate. To avoid physical violations (e.g., short-circuits), embodiments as disclosed herein include gap cells to isolate component groups that belong in different power domains.

Embodiments as disclosed herein offer a design advantage regardless of the process node technology used in the circuit layout (e.g., 20 nm node, 16 nm node, 10 nm node, or less). One advantage of certain embodiments is the ability to shut-off a region of the chip that is not being used, to reduce power consumption (e.g., turn off the power for a given component group in a given power domain).

FIG. 1 illustrates a plan view of a circuit layout 100 including multiple component groups 150-1, 150-2, 150-3 and 150-4 (hereinafter, collectively referred to as "component groups 150"), according to some embodiments. Each of component groups 150 is associated with a power domain including a power rail and a ground rail. For example, component group 150-1 includes VDD power rails 110-1 and 110-2 (hereinafter, collectively referred to as "power rails 110"), and VSS ground rails 120-1 and 120-2 (hereinafter, collectively referred to as "ground rails 120") coupled with logic cells 130-1 and 130-2 (hereinafter, collectively referred to as "logic cells 130"). Likewise, component group 150-2 includes VDD power rails 110, and VSS ground rails 122-1 and 122-2 (hereinafter, collectively referred to as "ground rails 122") coupled with logic cells 132-1 and 132-2 (hereinafter, collectively referred to as "logic cells 132"). Note that, in general, ground rails 120 may be coupled with a different ground source as ground rails 122 (e.g., ground rails 120 may be "floating" with respect to ground rails 122). Component group 150-3 may include VDD power rail 112 and VSS ground rail 122-1, coupled with logic cell 134. And component group 150-4 may include VDD power rail 110-2 and VSS ground rail 124, coupled with logic cell 136. Power rail, a ground rails 110, ground rails 120, and a bulk terminal may be coupled to a net, based on a net attribute provided by a manufacturer.

In embodiments as disclosed herein, a bulk terminal connects to the bulk or body terminal of a field effect transistor (FET). For a positive-channel FET (PFET), a bulk terminal is coupled with the negative bulk (N-well), which is usually connected to a power terminal. For a negative-channel FET (NFET), a bulk terminal is coupled with the positive bulk (P-well) or the substrate, which is usually connected to the ground net.

Logic cells 130, 132, 134 and 136 may include a combination of complementary metal-oxide-semiconductor (CMOS) transistors. For example, in some embodiments logic cells 130, 132, 134 and 136 may include one or more PFETs and one or more NFETs. Logic cells 130, 132, 134 and 136 may include four terminals: a gate terminal (Vgate, typically carrying the signal), a drain (VDD) terminal, a source terminal (e.g., VSS or ground) and a bulk terminal. Typically, the gate terminal includes a voltage between VSS<Vgate<VDD.

To electrically isolate component group 150-1 from component group 150-2 some embodiments include gap cells 140-1 and 140-2 (hereinafter, collectively referred to as "gap cells 140") and gap cells 142-1 and 142-3 (hereinafter, collectively referred to as "gap cells 142"). Likewise, to electrically isolate component group 150-2 from component groups 150-3 and 154, some embodiments include gap cells 142-2 and 142-4 (included as "gap cells 142") and gap cells 144 and 145. Gap cells 140, 142, and 144 ensure that an appropriate physical gap separates two different power domains. In general, gap cells 140 are different from gap cells 142 and 144 based on common power, common ground, or common substrate couplings. For example, gap cells 140 are coupled to VDD power rails 110 and VSS ground rails 120, whereas gap cells 142 share VDD power rails 110 but are coupled to VSS ground rails 122. Likewise, gap cell 144 shares VSS ground rail with gap cells 142, but is coupled with VDD power rail 112. And gap cell 145 shares VDD power rail 110-2 with gap cells 142, but is coupled with a different ground rail 124. Such gap cells that share one of a power rail or a ground cell may be "complementary" to each other, and the placement engine may be configured to place complementary cells adjacent to each other. For example, a gap cell 140 may be placed next to a gap cell 142. Similarly, a gap cell 142 may be placed next to a gap cell 144. Accordingly, in some embodiments a placement engine arranges component groups 150 in a plane as shown such that all, or almost all, of the gap cells along a horizontal direction are gap cells of a different type. This ensures a more efficient usage of circuit real-estate. Further, in some embodiments gap cells have a geometry selected according to real estate optimization and to optimize the wire length of the power rails. Gap cells 140, 142 and 144 may include an area of bulk semiconductor material with no active part or component. In some embodiments, circuit layout 200 may include filler cells in an empty area of the circuit layout after gap cells 140, 142 and 144 are placed. While gap cells 140, 142 and 144 satisfy an electric condition for the circuit components (e.g., avoid a short-circuit), the placement engine may further include a filler cell, to meet layer density requirements from the overall area perspective (e.g., material and structural stability of the chip-planarity-).

In some embodiments, filler cells ensure continuous supply rails (power and ground) for easy hook-up and continuous layers, e.g., negative-well (Nwell) and implant layers, to reduce design rule checks (DRC). Additionally, filler cells may also be used as place holders for future ECOs (e.g. to add new cells desired by a design change) without significant change to the layout and associated area impact.

Figure 2:
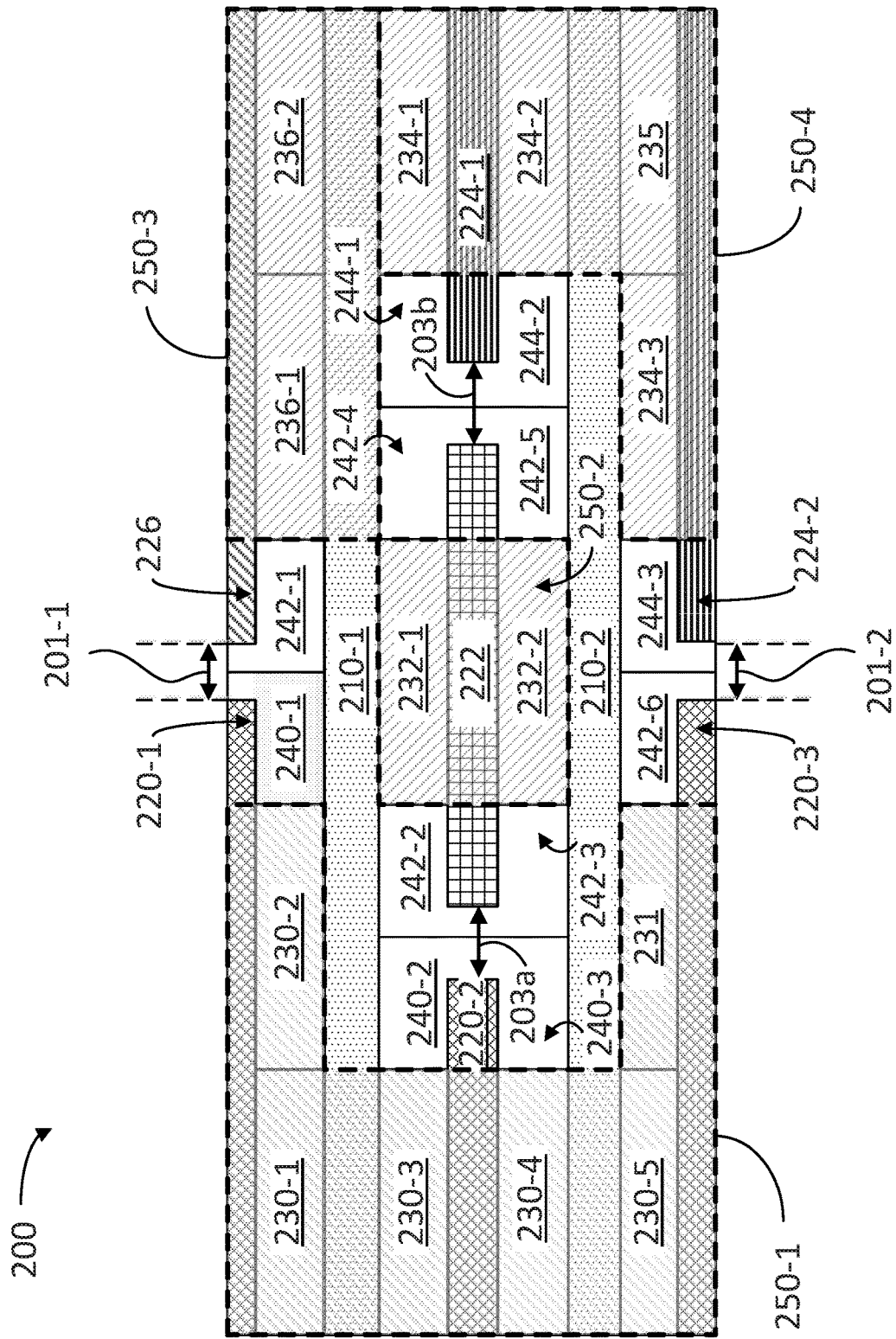
FIG. 2 is a plan view of a more complex circuit layout including multiple power domains, according to some embodiments.

FIG. 2 is a plan view of a circuit layout 200 including multiple power domains, according to some embodiments. Component groups 250-1, 250-2, 250-3 and 250-4 (hereinafter, collectively referred to as "component groups 250"), in circuit layout 200 include multiple components coupled with a power rail 210-1 or 210-2 (hereinafter, collectively referred to as "power rails 210"), a ground rail 220-1, 220-2, and 220-3 (hereinafter, collectively referred to as "ground rails 220").

Component group 250-1 includes core cells 230-1, 230-2, 230-3, 230-4, and 230-5 (collectively referred to, hereinafter, as "cells 230") coupled to power rails 210 and ground rails 220. Component group 250-2 includes core cells 232-1 and 232-2 (hereinafter, collectively referred to as "cells 232") coupled to power rails 210 and ground rail 222. Component group 250-3 includes core cells 236-1 and 236-2 (hereinafter, collectively referred to as "cells 236") coupled to power rail 210-1 and ground rail 226. Component group 250-4 include core cells 234-1, 234-2 and 234-3 coupled with power rails 210 and ground rails 224-1 and 224-2 (hereinafter, collectively referred to as "ground rails 224"). Further, component groups 250-1 and 250-4 may include filler cells 231 and 235, respectively, to maintain a planarity requirement and a layer density requirement for the circuit design.

The components in each of component groups 250 may also be coupled to a bulk. Different power rails and ground rails may be coupled to different power sources, according to circuit specifications. For example, power rails 210 may be coupled to a drain voltage (VDD) source at about 1 V, or more. Likewise, ground rails 220 may be coupled to a ground source that is floating relative to ground rails 224, or ground rail 226.

Each component group 250 includes internal clusters of components selected based on a group cost and including the group cost in an overall cost function. The group cost may be evaluated in terms of the power specification for the selected component group 250, the area that the group occupies in the chip, and the cost of fabrication (e.g., the number of components, interconnects, and circuit layers used by the component group). The internal clusters may include a core logic cell in the component group associated with the power specification for the selected component group.

Component groups 250 prioritize inclusion of components in a shared net with a predetermined power specification (e.g., as provided by a circuit designer). A placement engine as disclosed herein is configured to select core cells within each of component groups 250 around a shared common rail. In some embodiments, a placement engine flips logic cells around to share a common power rail, e.g., cells 230-3, 230-4 and 230-5 are vertically aligned around VSS rail 220-2. Embodiments as disclosed herein modify circuit layout 200 by moving a component associated with a power rail in a different power specification, away from the component group. In some embodiments, component groups 250 includes internal clusters of logic cells and components associated with power rails and ground rails matching a pattern with a name indicative of a power source, a ground source, or a bulk coupled with a net in the component group. For example, in some embodiments, a pattern indicative of a power rail may include a prefix "VDD" (e.g., "VDD1," "VDD2," and the like). Likewise, a pattern indicative of a ground rail may include a prefix "VSS" (e.g., "VSS1," "VSS2," "VSS3" and the like).

In some embodiments, a gap 201-1 or 201-2, may be formed between two component groups based on circuit specifications. Gap 201-1 is filled, at least partially, with a gap cell 240-1, adjacent to power rail 210-1 and to ground rail 220-1. Also filling gap 201-1 partially, a second gap cell 242-1 is adjacent to power rail 210-1 and to ground rail 226. Gap cells 240-1 and 242-1 are different in that they are coupled in the lower end with ground rails 220-1 and 226, respectively, which may be coupled with different ground sources. Accordingly, gap 201-1 is filled by two different (e.g., complementary) gap cells 240-1 and 242-1. A gap 203a is filled, at least partially, with a gap cell 240-2, adjacent to power rail 210-1 and to ground rail 220-2. Also filling gap 203a partially, a second gap cell 242-2 is adjacent to power rail 210-1 and to ground rail 222. Gap 203a is also filled, at least partially, with a gap cell 240-3, adjacent to power rail 210-2 and to ground rail 220-2. Gap cells 240-2 and 240-3 (hereinafter, collectively referred to as "gap cells 240") are similar in that they are coupled in the lower end with ground rail 220-2 and with power rails 210 in the higher end.

Also filling gap 203a at least partially, a gap cell 242-2 is adjacent to power rail 210-1 and to ground rail 222, and a gap cell 242-3 is adjacent to power rail 210-2 and to ground rail 222. Gap cells 242-2 and 242-3 (hereinafter, collectively referred to as "gap cells 242") are similar in that they are coupled in the lower end with ground rail 222 and with power rails 210 in the higher end. Gap cells 240 and 242 are different in that they are coupled in the lower end with ground rails 220-2 and 222, respectively, which may be coupled with different ground sources.

Similarly to gap 203*a*, a gap 203*b* is partially filled by gap cells 242-4 and 242-5 (collectively referred to, hereinafter, as "gap cells 242"). Gap cells 242 are coupled on the high end with power rails 210-1 (gap cell 242-1) and 210-2 (gap cell 242-5), and on the lower end with ground rail 222. Gap 203*b* is also partially filled by gap cells 244-1 and 244-2 (collectively referred to, hereinafter, as "gap cells 244"). Gap cells 244 are coupled on the high end with power rails 210-1 (gap cell 244-1) and 210-2 (gap cell 244-2), and on the lower end with ground rail 224-1. In that regard, gap cells 242 and 244 have a common power source for power rails 210, and different ground sources for ground rails 222 and 224-1, respectively.

Likewise, gap 201-2 is partially filled by gap cells 242-6 and 244-3. Gap cell 242-6 is coupled on the high end with power rail 210-2, and on the lower end with ground rail 220-3. Accordingly gap cell 242-6 may be lumped with gap cells 242 for ground rail 220-3 may be coupled with the same ground as ground rails 220-1 and 220-2. Gap 203*b* is also partially filled by gap cell 244-3. Gap cells 244-3 is coupled on the high end with power rail 210-2, and on the lower end with ground rail 224-2. In that regard, gap cell 244-3 may be lumped with gap cells 244 for ground rail 224-2 may be coupled with the same ground as ground rail 224-1. Gap cells 242-6 and 244 have a common power source for power rails 210, and different ground sources for ground rails 220-3 and 224-2, respectively.

Gap cells coupled with power rails sharing either a common power source, or with ground rails sharing a common ground source, may be referred to as "complementary," rather than being identical. Accordingly, in some embodiments two or more gap cells in a horizontal direction may be complementary, but not identical. Moreover, in some embodiments gaps (e.g., gaps 201 and 203) may be at least partially filled by two or more complementary gap cells.

In some embodiments, gap cells that are coupled with the same power source and the same ground source are aligned in a vertical direction in circuit layout 200 (e.g., gap cells 240, 242, and 244). Accordingly, in some embodiments no gap is placed between a first instance of a logic cell sharing a common power rail and a common ground rail with a second instance of the logic cell (e.g., between any two logic cells 230, 232, 234 and 236). Cells 236 in domain 250-3 share the same VDD (power) rail 110-1 as cells 130 from domain 250-1. However, ground rail VSS 126 for cells 136 in domain 250-3 is different from ground rail VSS 120-1 for cells 130 in domain 250-1. Gap cells 240-1 and 242-1 maintain a physical gap 201-1 separating VSS 226 and VSS 220-1 from contact. Likewise, physical gap 201-2 separates VSS 224-2 and VSS 220-3, and physical gaps 203*a* and 203*b* (hereinafter, collectively referred to as "physical gaps 203") maintain a separation between VSS 222 and VSS 220-2 (physical gap 203*a*), and between VSS 222 and VSS 224-1 (physical gap 203*b*). The size of gaps 201 and 203 is selected based on the technology node used for the specific circuit layout 200.

Figure 3A:
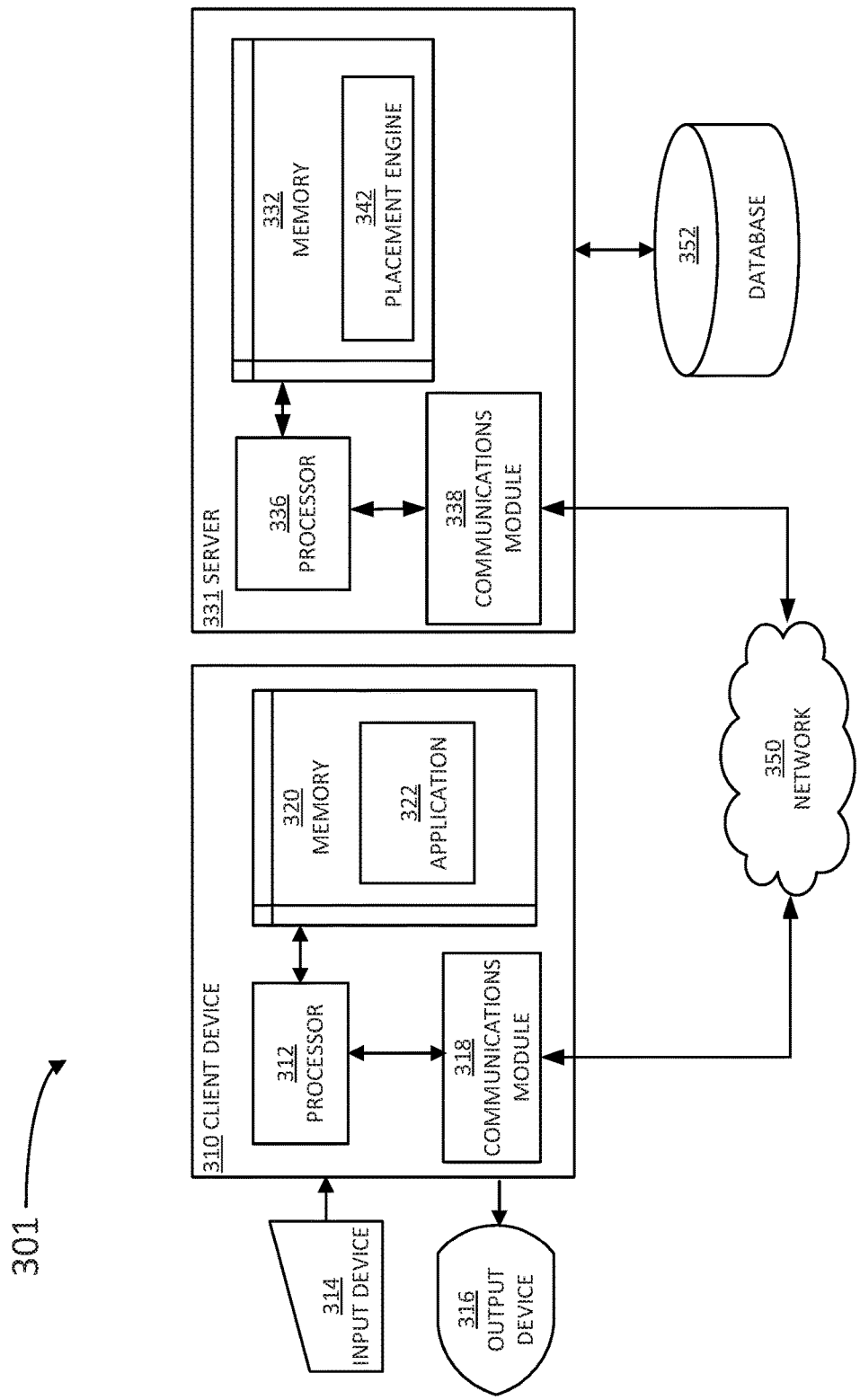
FIG. 3A illustrates an example architecture suitable for placing circuit components in a circuit layout including multiple power domains, according to some embodiments.

FIG. 3A illustrates an example architecture 301 suitable for placing circuit components in a circuit layout 300 including multiple power domains, according to some embodiments. A circuit designer may use a client device 310 communicatively coupled with server 331 over network 350 via respective communications modules 318 and 338. Communications modules 318 and 338 are configured to interface with network 350 to send and receive information, such as data, requests, responses, and commands to other devices on the network. Communications modules 318 and 338 can be, for example, modems or Ethernet cards. An input device 314 (e.g., a keyboard, a mouse, a pointer, a microphone or a touchscreen display, and the like) and an output device 316 (e.g., a touchscreen display, a display, a speaker, and the like) enable the circuit designer to interact with client device 310.

Server 331 includes a memory 232, a processor 336, and communications module 338. Processor 336 is configured to execute instructions, such as instructions physically coded into processor 336, instructions received from software in memory 332, or a combination of both. Memory 332 includes a placement engine 342 for searching components stored in a component database 352. A user may access placement engine 342 through a placement application 322 or a web browser installed in client device 310. Accordingly, placement application 322 may be installed by server 331 and perform scripts and other routines provided by server 331. In some embodiments, execution of placement application 322 is controlled by a processor 312 in client device 310.

Component database 352 typically includes a large number of components (e.g., about 50 thousand to 100 thousand or more). Component database 252 may be handled by a remote server that is different from server 331. In some embodiments, placement engine 342 and at least one of component database 352 may be hosted in a different server that is accessible by server 331.

Figure 3B:
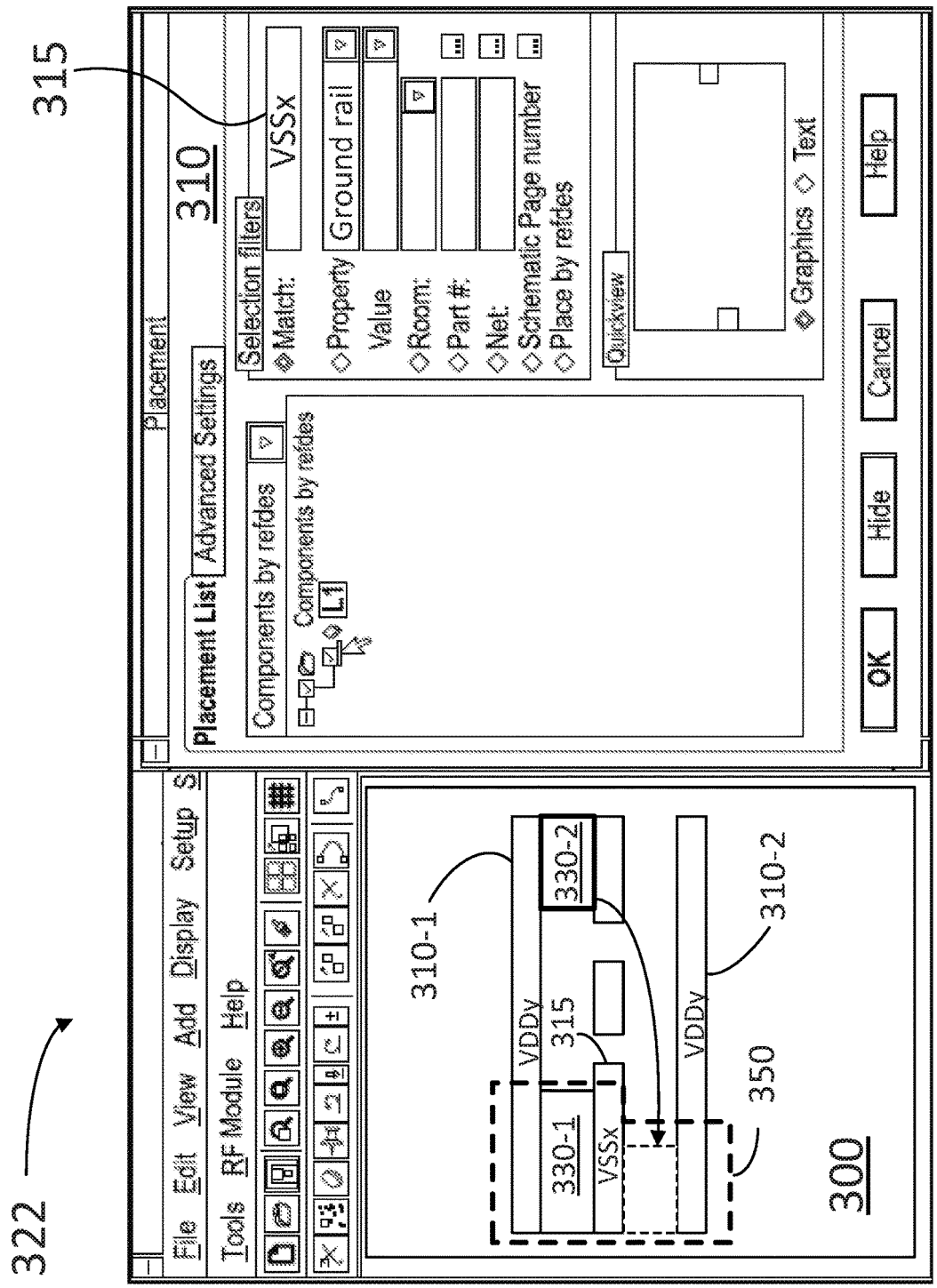
FIG. 3B is a screenshot illustrating a user interface for an application in the architecture of FIG. 3A, according to some embodiments.

FIG. 3B is a screenshot of placement application 322 illustrating a user interface 310 for placement of circuit components in a circuit layout 300, according to some embodiments. The screenshot may be displayed on a display of output device 316 for a circuit designer using client device 310. Accordingly, some of the components in circuit layout 300 may be selected by the circuit designer from database 352, accessed via a server 331 through network 350.

A first power rail 310-1 and a second power rail 310-2 (hereinafter, collectively referred to as "power rails 310") provide a high power state for the components in component group 350, and a ground rail VSSx 315 provides the low power state to component group 350. A logic cell 330-2 that is originally outside of component group 350 is identified as sharing the same power and ground sources. For example, a matching tab 315 determines that logic cell 330-2 includes, or belongs, to a net that includes a source rail labeled "VSSx" and a power rail labeled "VDDy." Therefore, the placement application moves logic cell 330-2 in circuit layout 300 from its original location in the input layout to a location within component group 350. This action clears real-estate in circuit layout 300, and improves the wiring and interconnect requirements for the components in component group 350. In addition, the use of gaps and gap cells is reduced, as they are not needed within component group 350.

Figure 4:
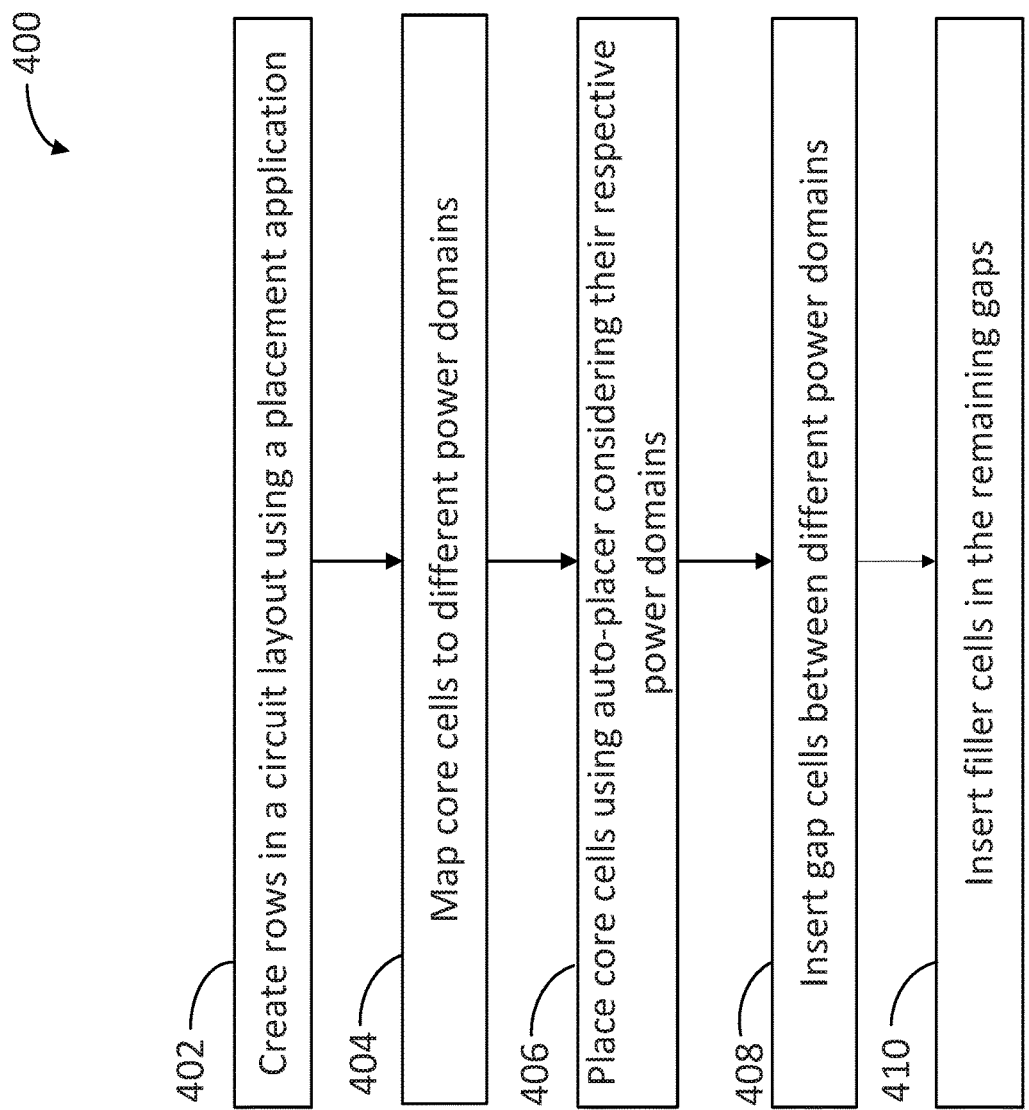
FIG. 4 is a flow chart illustrating steps in a method for placing components in a circuit layout including multiple power domains, according to some embodiments.

FIG. 4 is a flow chart illustrating steps in a method 400 for placing components in a circuit layout including multiple power domains (e.g., circuit layouts 100, 200, and 300). At least some of the steps in method 400 may be performed by a computer having a processor executing commands stored in a placement application in the memory of the computer (e.g., client device 310, server 331, processors 312 and 336, placement application 322 and placement engine 342, memories 320 and 332). Further, steps as disclosed in method 400 may include retrieving, editing, and/or storing files in a database that is part of, or is communicably coupled to, the computer (e.g., database 352). Methods consistent with the present disclosure may include at least some, but not all, of the steps illustrated in method 400, performed in a different sequence. Furthermore, methods consistent with the present disclosure may include at least two or more steps as in method 400, performed overlapping in time, or almost simultaneously.

Step 402 includes creating rows in the circuit layout (e.g., along the horizontal direction of the circuit layout) using a placement application.

Step 404 includes mapping core cells to different power domains (e.g., different component groups such as component groups 150 or 250).

Step 406 includes placing core cells using auto-placer considering their respective domains. In some embodiments, step 406 may include selecting a set of instances from the circuit layout and placing core cells from the set of instances. In some embodiments, step 406 may include placing core cells from the entire circuit layout for placement.

Step 408 includes inserting gap cells between different power domains.

Step 410 includes inserting filler cells in the remaining gaps (e.g., filler cells 131 and 135).

Figure 5:
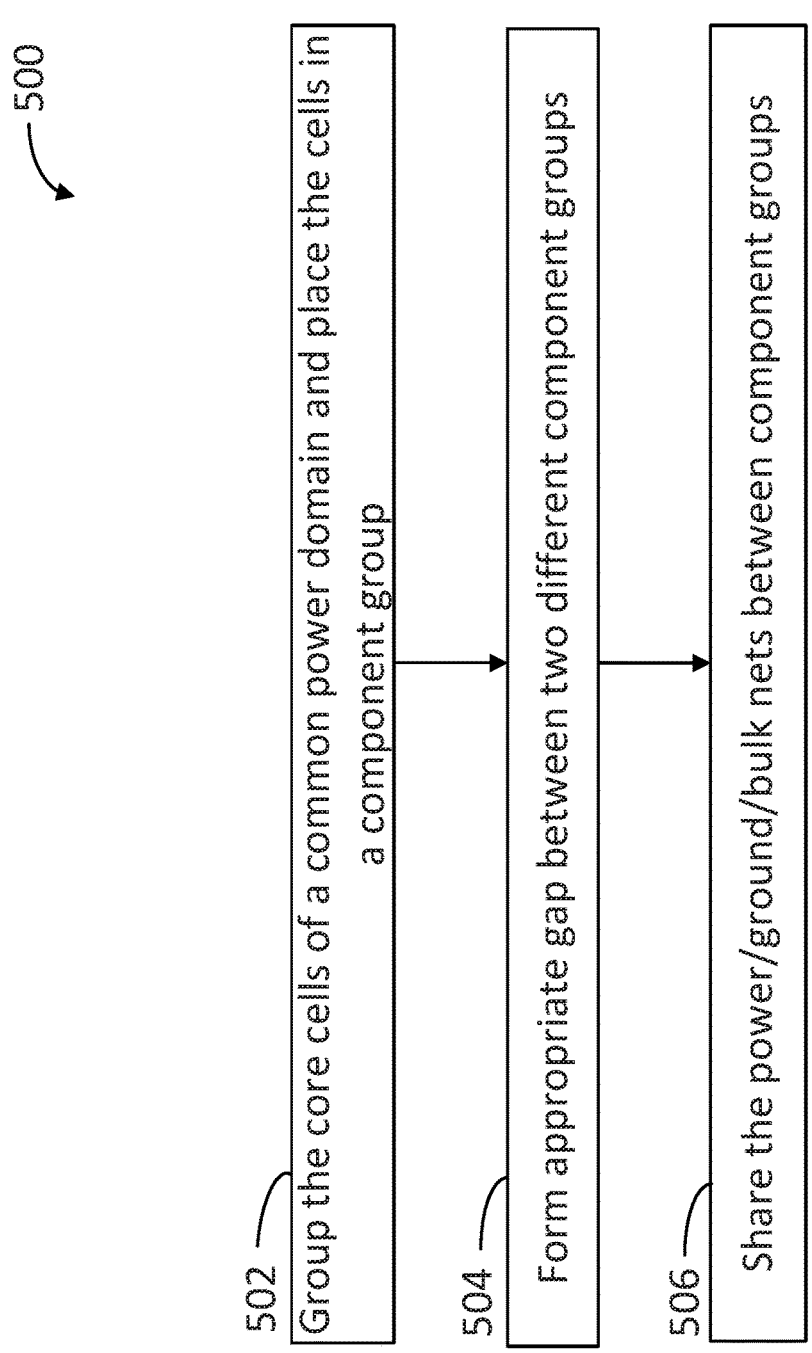
FIG. 5 is a flow chart illustrating steps in a method for placing core cells in a circuit layout, according to some embodiments.

FIG. 5 is a flow chart illustrating steps in a method 500 for placing core cells in a circuit layout (e.g., circuit layouts 100, 200, and 300), according to some embodiments. At least some of the steps in method 500 may be performed by a computer having a processor executing commands stored in a placement application in the memory of the computer (e.g., client device 310, server 331, processors 312 and 336, placement application 322 and placement engine 342, memories 320 and 332). Further, steps as disclosed in method 500 may include retrieving, editing, and/or storing files in a database that is part of, or is communicably coupled to, the computer (e.g., database 352). Methods consistent with the present disclosure may include at least some, but not all, of the steps illustrated in method 500, performed in a different sequence. Furthermore, methods consistent with the present disclosure may include at least two or more steps as in method 500, performed overlapping in time, or almost simultaneously.

Step 502 includes grouping the core cells of a common power domain and placing the cells in a component group. In some embodiments, step 502 may include matching power source terminal labels and ground terminal labels according to a common prefix (e.g., VDD*, VSS* and the like). In some embodiments, step 502 includes identifying the power domain of the core cells according to a signal type of a net associated with the cell.

Step 504 includes forming an appropriate gap between two different component groups. In some embodiments, step 504 may include determining the size of the gap based on the specific power source and ground terminal associated with the different component groups (e.g., selecting a larger gap for a larger voltage difference between the power sources of two component groups). In some embodiments, step 508 includes selecting a gap that is greater than or equal to the total width of two gap cells.

Step 506 includes sharing the power, ground and bulk nets between the component groups, when possible. In some embodiments, step 506 includes sharing a power net with a bulk terminal for a component that includes a PFET. In some embodiments, step 506 includes sharing a ground net with the bulk terminal of a component that includes an NFET.

Figure 6:
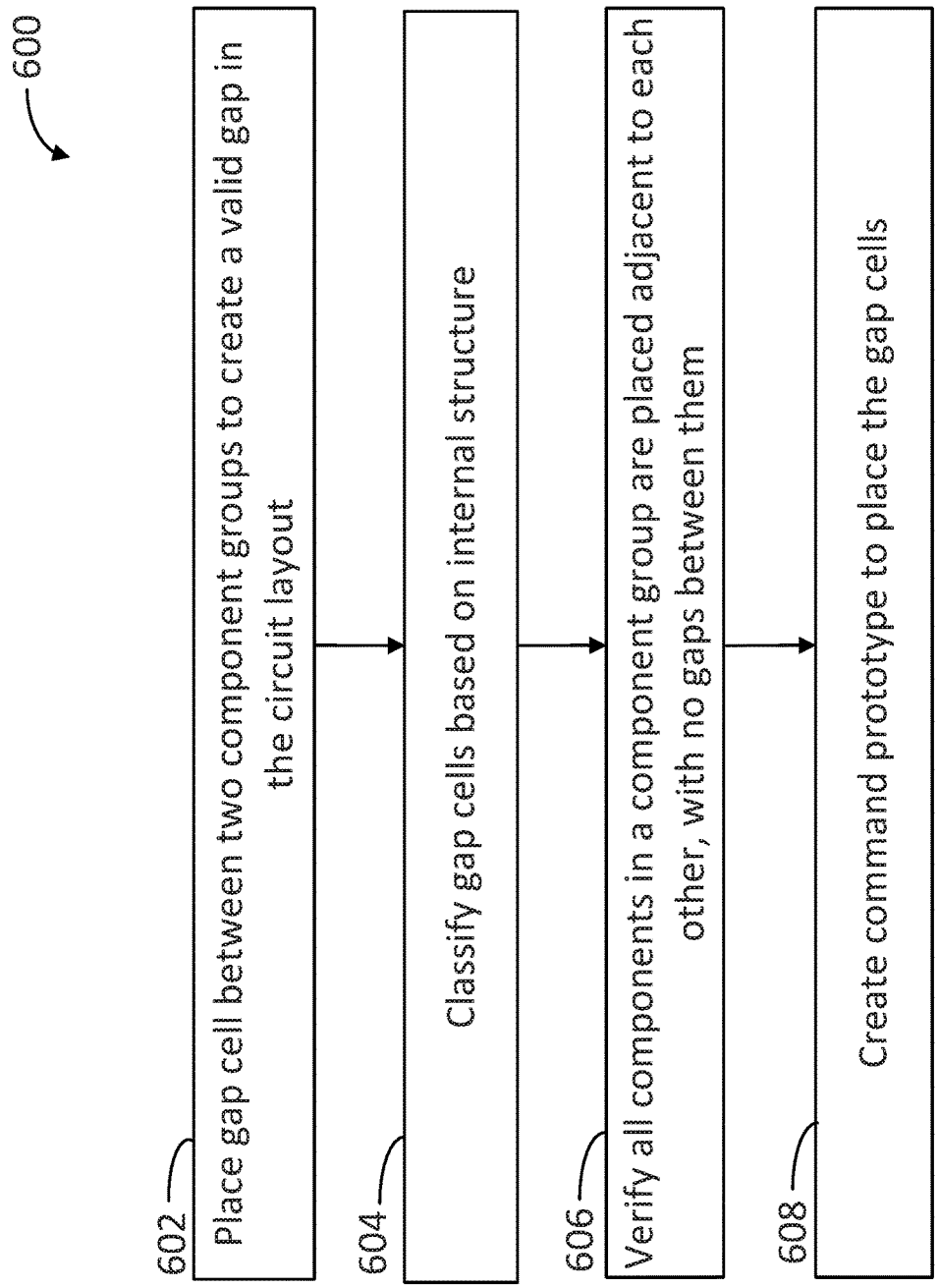
FIG. 6 is a flow chart illustrating steps in a method for inserting gap cells in a circuit layout, according to some embodiments.

FIG. 6 is a flow chart illustrating steps in a method 600 for inserting gap cells in a circuit layout (e.g., circuit layouts 100, 200, and 300), according to some embodiments. At least some of the steps in method 600 may be performed by a computer having a processor executing commands stored in a placement application in the memory of the computer (e.g., client device 310, server 331, processors 312 and 336, placement application 322 and placement engine 342, memories 320 and 332). Further, steps as disclosed in method 600 may include retrieving, editing, and/or storing files in a database that is part of, or is communicably coupled to, the computer (e.g., database 352). Methods consistent with the present disclosure may include at least some, but not all, of the steps illustrated in method 600, performed in a different sequence. Furthermore, methods consistent with the present disclosure may include at least two or more steps as in method 600, performed overlapping in time, or almost simultaneously.

Step 602 includes placing a gap cell between two component groups to create a valid ("legal") gap in the circuit layout. In some embodiments, step 602 includes placing the gap cells in pairs of complementary gap cells (e.g., gap cells 140 and 142, or gap cells 142 and 144).

Step 604 includes classifying the gap cells based on an internal structure. In some embodiments, step 604 includes labelling the gap cells with a convention based on the classification.

Step 606 includes verifying that all components in a component group are placed adjacent to each other (e.g., with no gaps in between). Accordingly, gap cells along a horizontal direction in the chip will be of a different type.

Step 608 includes creating a command to place the gap cells in the circuit layout.

Figure 7:
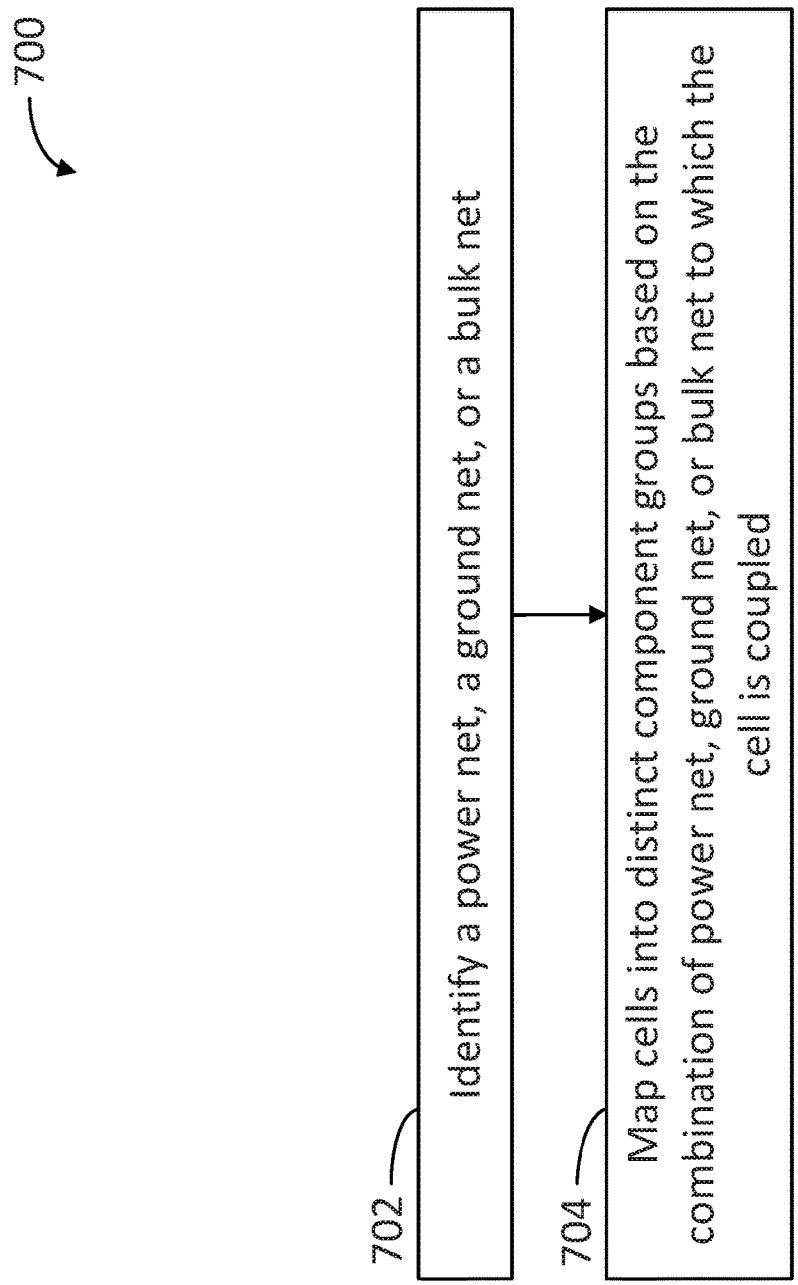
FIG. 7 is a flow chart illustrating steps in a method for mapping a core cell to a power domain in a circuit layout including multiple power domains, according to some embodiments.

FIG. 7 is a flow chart illustrating steps in a method 700 for mapping a core cell to a power domain in a circuit layout (e.g., circuit layouts 100, 200, and 300), according to some embodiments. At least some of the steps in method 700 may be performed by a computer having a processor executing commands stored in a placement application in the memory of the computer (e.g., client device 310, server 331, processors 312 and 336, placement application 322 and placement engine 342, memories 320 and 332). Further, steps as disclosed in method 700 may include retrieving, editing, and/or storing files in a database that is part of, or is communicably coupled to, the computer (e.g., database 352). Methods consistent with the present disclosure may include at least some, but not all, of the steps illustrated in method 700, performed in a different sequence. Furthermore, methods consistent with the present disclosure may include at least two or more steps as in method 700, performed overlapping in time, or almost simultaneously.

Step 702 includes identifying a power net, a ground net, or a bulk net, based on connectivity information from a layout view of the circuit. In some embodiments, step 702 may include identifying the power net by matching core cells and other circuit components in the circuit layout having terminal labels matching the prefix VDD, and the like. Likewise, in some embodiments, step 702 includes identifying the ground net by matching core cells and other circuit components in the circuit layout having terminal labels matching the prefix VSS, and the like.

Step 704 includes mapping cells into distinct component groups based on the combination of power net, ground net, or bulk net to which the cell is coupled. In some embodiments, step 704 includes placing core cells into different component groups based on the combination of power, ground and bulk nets coupling the cells. In some embodiments, step 704 includes selecting the cells randomly, without prioritizing a power net, a ground net, or a bulk net. In some embodiments, step 704 includes selecting the cells according to a priority schedule between a power net, a ground net, and the bulk net.

Figure 8:
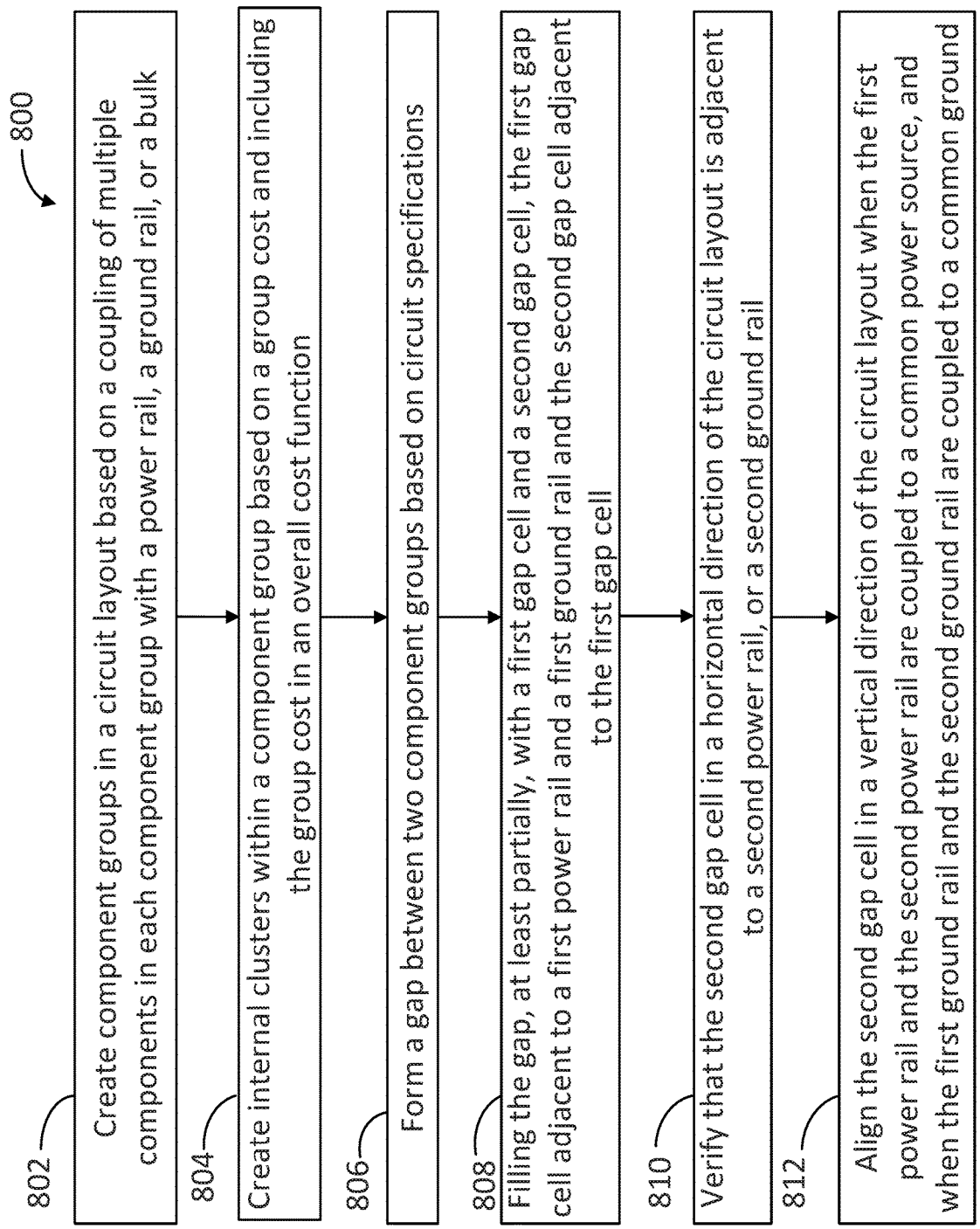
FIG. 8 is a flow chart illustrating steps in a method for placing components in a circuit layout including multiple power domains, according to some embodiments.

FIG. 8 is a flow chart illustrating steps in a method 800 for placing components in a circuit layout (e.g., circuit layouts 100, 200, and 300), according to some embodiments. At least some of the steps in method 800 may be performed by a computer having a processor executing commands stored in a placement application in the memory of the computer (e.g., client device 310, server 331, processors 312 and 336, placement application 322 and placement engine 342, memories 320 and 332). Further, steps as disclosed in method 800 may include retrieving, editing, and/or storing files in a database that is part of, or is communicably coupled to, the computer (e.g., database 352). Methods consistent with the present disclosure may include at least some, but not all, of the steps illustrated in method 800, performed in a different sequence. Furthermore, methods consistent with the present disclosure may include at least two or more steps as in method 800, performed overlapping in time, or almost simultaneously.

Step 802 includes creating component groups in a circuit layout based on a coupling of multiple components in each component group with a power rail, a ground rail, or a bulk. In some embodiments, step 802 includes rejecting a move of a component or a logic cell within the component group when at least one of a group spacing rule, a domain rule, or a power sharing specification are violated by the move. In some embodiments, step 802 includes prioritizing an inclusion of components in a shared net with a predetermined power specification in the component group, and moving a component associated with a power rail with a different power specification apart from the component group. In some embodiments, step 802 includes identifying a power rail, a ground rail, and a bulk coupled to a net, based on a net attribute. In some embodiments, step 802 includes matching a pattern with a name indicative of a power rail, a ground rail, or a bulk coupled with a net in the component group.

Step 804 includes creating internal clusters within a component group based on a group cost and including the group cost in an overall cost function. In some embodiments, step 804 includes identifying a core logic cell in the component group, and associating a power domain to the component group based on a power specification of the core logic cell.

Step 806 includes forming a gap between two component groups based on circuit specifications.

Step 808 includes filling the gap, at least partially, with a first gap cell and a second gap cell, the first gap cell adjacent to a first power rail and a first ground rail, and the second gap cell adjacent to the first gap cell. In some embodiments, step 808 includes inserting the second gap cell that is complementary to the first gap cell, and the second gap cell is adjacent to at least one unshared power rail, or ground rail, or bulk. In some embodiments, the first gap cell is different from the second gap cell, and step 808 includes coupling the first gap cell and the second gap cell with one of a common power, a common bulk, or a common ground to avoid a short circuit between the two component groups.

Step 810 includes verifying that the second gap cell in a horizontal direction of the circuit layout is adjacent to a second power rail, or a second ground rail.

Step 812 includes aligning the second gap cell in a vertical direction of the circuit layout when the first power rail and the second power rail are coupled to a common power source, and when the first ground rail and the second ground rail are coupled to a common ground. Accordingly, method 800 ensures maximal power sharing across different component rows (e.g., logic cells arranged along a horizontal direction in the circuit layout). In some embodiments, step 812 includes inserting filler cells in an empty area of the circuit layout after the first and second gap cells are placed.

Figure 9:
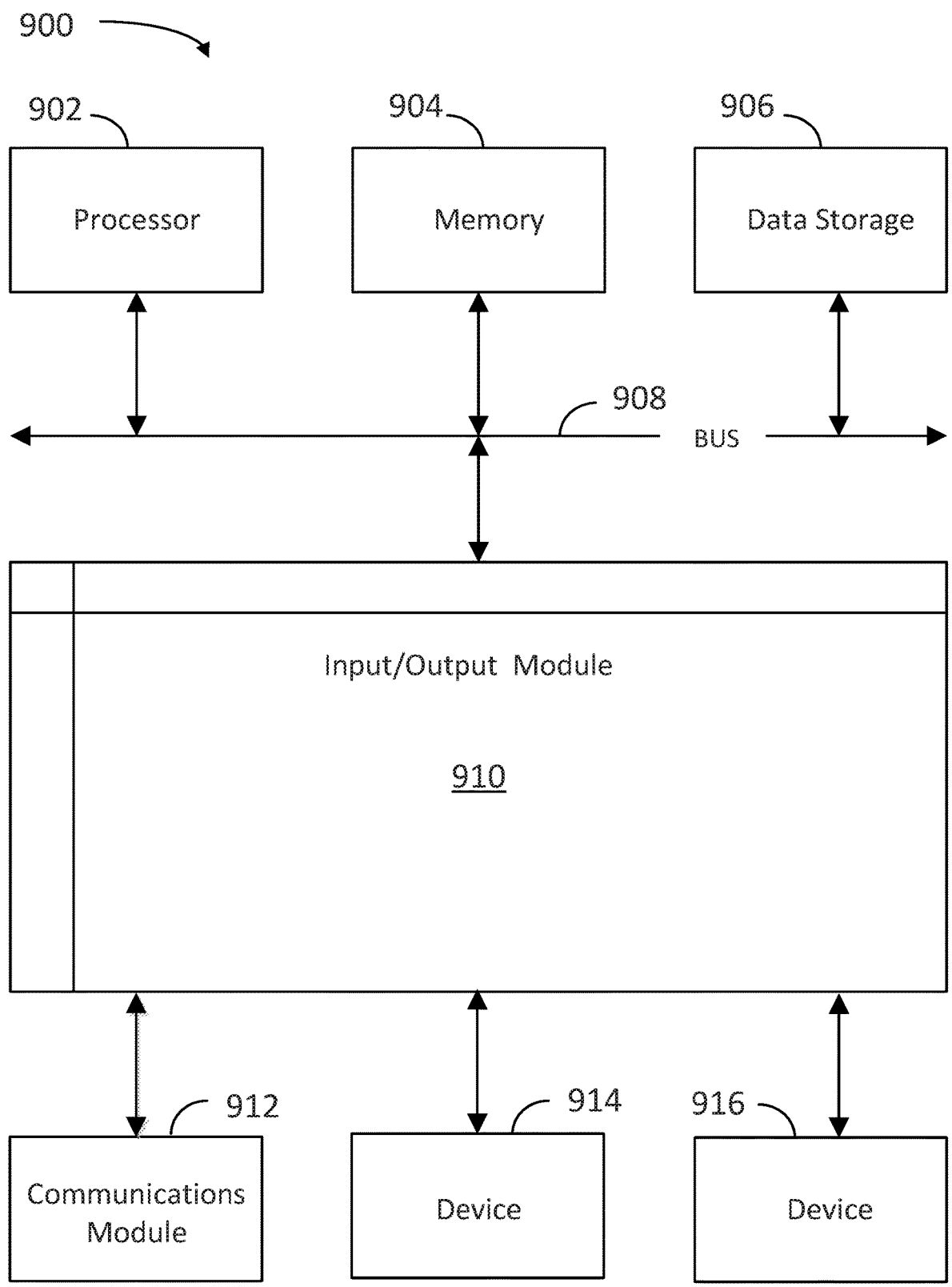
FIG. 9 is a block diagram illustrating an example computer system that includes a design tool, according to some embodiments.

FIG. 9 is a block diagram illustrating an example computer system 900 with which the methods and steps illustrated in FIGS. 4-8 can be implemented, according to some embodiments. In certain aspects, computer system 900 can be implemented using hardware or a combination of software and hardware, either in a dedicated server, integrated into another entity, or distributed across multiple entities (e.g., client device 310 and server 331).

Computer system 900 includes a bus 908 or other communication mechanism for communicating information, and a processor 902 coupled with bus 908 for processing information. By way of example, computer system 900 can be implemented with one or more processors 902. Processor 902 can be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. In some embodiments, processor 902 may include modules and circuits configured as a 'placing' tool or engine, or a 'routing' tool or engine, to place devices and route channels in a circuit layout, respectively, and as disclosed herein.

Computer system 900 includes, in addition to hardware, code that creates an execution environment for the computer program in question, e.g., code that constitutes processor firmware, a protocol stack, a database management system, an operating system, or a combination of one or more of them stored in an included memory 904, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. Processor 902 and memory 904 can be supplemented by, or incorporated in, special purpose logic circuitry.

The instructions may be stored in memory 904 and implemented in one or more computer program products, e.g., one or more modules of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, Wirth languages, embeddable languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions.

Computer system 900 is coupled via input/output module 910 to various devices. The input/output module 910 is any input/output module. Example input/output modules 910 include data ports such as USB ports. The input/output module 910 is configured to connect to a communications module 912. Example communications modules 912 include networking interface cards, such as Ethernet cards and modems. In certain aspects, the input/output module 910 is configured to connect to a plurality of devices, such as an input device 914 and/or an output device 916. Example input devices 914 include a keyboard and a pointing device, e.g., a mouse or a trackball, by which a user can provide input to the computer system 900. Other kinds of input devices 914 are used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 916 include display devices, such as a LED (light emitting diode), CRT (cathode ray tube), or LCD (liquid crystal display) screen, for displaying information to the user.

Methods as disclosed herein may be performed by computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein (e.g., as in methods 400-800). One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., communication network 350. For example, some aspects of the subject matter described in this specification may be performed on a cloud-computing environment. Accordingly, in certain aspects a user of systems and methods as disclosed herein may perform at least some of the steps by accessing a cloud server through a network connection. Accordingly, some embodiments may include a server as described herein in a cloud computing environment, performing at least some of the steps consistent with method disclosed herein. For example, some embodiment may include a master server and one or more slave servers in a cloud computing environment, or a distributed, server-less environment wherein multiple nodes perform different instances of a network based application. Further, data files, circuit diagrams, performance specifications, and the like, resulting from the disclosure may be stored in a database server in the cloud-computing environment, or may be downloaded to a private storage device from the cloud-computing environment.

Computing system 900 includes servers and personal computer devices. A personal computing device and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions or data to processor 902 for execution. Such a medium may take many forms, including, but not limited to, non-volatile media, volatile media, and transmission media. Non-volatile media include, for example, optical disks, magnetic disks, or flash memory, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

In one aspect, a method may be an operation, an instruction, or a function, and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike, are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some," refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A computer-implemented method to form an integrated circuit design, the computer implemented method comprising:
    creating a plurality of component groups in a circuit layout of the integrated circuit design based on couplings of multiple components in each component group of the plurality of component groups with a power rail, a ground rail, or a bulk;
    creating internal clusters within a component group of the plurality of component groups based on a group cost and including the group cost in an overall cost function;
    forming a gap between two component groups of the plurality of component groups based on circuit specifications; and
    filling the gap, at least partially, with a first gap cell and a second gap cell, wherein the first gap cell is adjacent to a first power rail and to a first ground rail, and the second gap cell is adjacent to the first gap cell.

2. The computer-implemented method of claim 1, wherein the creating a plurality of component groups comprises rejecting a move of a component or a logic cell within a component group of the plurality of component groups when at least one of a group spacing rule, a domain rule, or a power sharing specification is violated by the move.

3. The computer-implemented method of claim 1, wherein the creating a plurality of component groups comprises:
prioritizing an inclusion of components in a shared net with a predetermined power specification in a component group of the plurality of component groups; and
moving a component associated with a power rail with a different power specification apart from the component group.

4. The computer-implemented method of claim 1, wherein the creating a plurality of component groups in the circuit layout comprises identifying a power rail, a ground rail, and a bulk coupled to a net, based on a net of the integrated circuit design in the circuit layout attribute.

5. The computer-implemented method of claim 1, wherein the creating a plurality of component groups comprises matching a pattern with a name indicative of a power rail, a ground rail, or a bulk coupled with a net in a component group of the plurality of component groups.

6. The computer-implemented method of claim 1, wherein the creating internal clusters within a component group of the plurality of component groups comprises identifying a core logic cell in the component group, and associating a power domain to the component group based on a power specification of the core logic cell.

7. The computer-implemented method of claim 1, wherein the filling the gap, at least partially, with a first gap cell comprises inserting a second gap cell that is complementary to the first gap cell, and the second gap cell is adjacent to at least one unshared power rail, or ground rail, or bulk.

8. The computer-implemented method of claim 1, further comprising inserting filler cells in an empty area of the circuit layout after the first gap cell and the second gap cell are placed.

9. The computer-implemented method of claim 1, wherein the first gap cell is different from the second gap cell, and filling the gap comprises coupling the first gap cell and the second gap cell with one of a common power, a common bulk, or a common ground to avoid a short circuit between the two component groups.

10. The computer-implemented method of claim 1, further comprising verifying that no gap is placed between a first instance of a logic cell sharing a common power rail and a common ground rail with a second instance of the logic cell.

11. A system, comprising:
a memory, storing instructions; and
at least one processor that executes the instructions to:
create a plurality of component groups in a circuit layout of an integrated circuit design based on couplings of multiple components in each component group of the plurality of component groups with a power rail, a ground rail, or a bulk;
create internal clusters within a component group based on a group cost and including the group cost in an overall cost function;
form a gap between two component groups of the plurality of component groups based on circuit specifications; and
fill the gap, at least partially, with a first gap cell and a second gap cell, wherein the first gap cell is adjacent to a first power rail and to a first ground rail, and the second gap cell is adjacent to the first gap cell.

12. The system of claim 11, wherein to create a plurality of component groups the at least one processor executes instructions to reject a move of a component or a logic cell within a component of the plurality of component groups when at least one of a group spacing rule, a domain rule, or a power sharing specification is violated by the move.

13. The system of claim 11, wherein to create a plurality of component groups the at least one processor executes instructions to:
prioritize an inclusion of components in a shared net with a predetermined power specification in a component group of the plurality of component groups; and
move a component associated with a power rail with a different power specification apart from the component group.

14. The system of claim 11, wherein to create a plurality of component groups the at least one processor executes instructions to identify a power rail, a ground rail, and a bulk coupled to a net of the integrated circuit design in the circuit layout, based on a net attribute.

15. The system of claim 11, wherein to create a plurality of component groups the at least one processor executes instructions to match a pattern with a name indicative of a power rail, a ground rail, or a bulk coupled with a net in a component group of the plurality of component groups.

16. The system of claim 11, wherein to fill the gap, at least partially, with a first gap cell the at least one processor executes instructions to insert a second gap cell that is complementary to the first gap cell, and the second gap cell is adjacent to at least one unshared power rail, or ground rail, or bulk.

17. The system of claim 11, wherein the at least one processor further executes instructions to further insert filler cells in an empty area of the circuit layout after the first gap cell and the second gap cell are placed.

18. A non-transitory, machine-readable medium comprising instructions stored in a memory which, when executed by a processor, cause a computer to perform steps in a method, the method comprising:
creating a plurality of component groups in a circuit layout of an integrated circuit design based on couplings of multiple components in each component group of the plurality of component groups with a power rail, a ground rail, or a bulk;
creating internal clusters within a component group of the plurality of component groups based on a group cost and including the group of the plurality of component groups cost in an overall cost function;
forming a gap between two component groups based on circuit specifications; and
filling the gap, at least partially, with a first gap cell and a second gap cell, wherein the first gap cell is adjacent to a first power rail and to a first ground rail, and the second gap cell is adjacent to the first gap cell.

19. The non-transitory, machine-readable medium of claim 18, wherein the method includes creating component groups comprises rejecting a move of a component or a logic cell within the component group when at least one of a group spacing rule, a domain rule, or a power sharing specification is violated by the move.

20. The non-transitory, machine-readable medium of claim 18, wherein the method of creating a plurality of component groups comprises:
prioritizing an inclusion of components in a shared net with a predetermined power specification in a component group of the plurality of component groups the component group; and moving a component associated with a power rail with a different power specification apart from the component group.

* * * * *